United States Patent [19]
Hara

[11] Patent Number: 5,237,317
[45] Date of Patent: Aug. 17, 1993

[54] IMAGE DISPLAY APPARATUS

[75] Inventor: Zenichiro Hara, Nagasaki, Japan

[73] Assignee: Mitsubishi Denki Kabushiki Kaisha, Tokyo, Japan

[21] Appl. No.: 514,276

[22] Filed: Apr. 25, 1990

[30] Foreign Application Priority Data

Apr. 27, 1989 [JP] Japan ................... 1-108934

[51] Int. Cl.⁵ ............................... G09G 3/00
[52] U.S. Cl. ..................... 340/798; 358/140; 340/799
[58] Field of Search ............ 340/814, 731, 798, 799; 358/140, 148, 133; 360/11.1

[56] References Cited

U.S. PATENT DOCUMENTS

| | | | |
|---|---|---|---|
| 3,748,381 | 7/1973 | Strobele et al. | 360/14.1 |
| 4,121,283 | 10/1978 | Walker | 340/706 |
| 4,322,750 | 3/1982 | Lord et al. | 340/728 |
| 4,412,251 | 10/1983 | Tanaka et al. | 358/140 |
| 4,604,651 | 8/1986 | Frencken et al. | 358/140 |
| 4,651,209 | 3/1987 | Okada et al. | 358/140 |
| 4,720,744 | 1/1988 | Washi et al. | 358/140 |
| 4,723,163 | 2/1988 | Skinner | 358/140 |
| 4,742,350 | 5/1988 | Ko et al. | 358/148 |
| 4,808,989 | 2/1989 | Tabata et al. | 340/798 |
| 4,868,656 | 9/1989 | Geiger et al. | 358/140 |
| 5,038,300 | 8/1991 | Seiler et al. | 340/703 |
| 5,072,296 | 12/1991 | Lim | 358/140 |

FOREIGN PATENT DOCUMENTS 0291252 11/1988 European Pat. Off. .
2214185 11/1971 Fed. Rep. of Germany ..... 360/11.1

OTHER PUBLICATIONS

Harald Schöfer, "Flimmerfreie Videobilder", *Ekeltronik*, No. 4, (Feb. 1988).

Primary Examiner—Ulysses Weldon
Assistant Examiner—Amare Mengistu
Attorney, Agent, or Firm—Burns, Doane, Swecker & Mathis

[57] ABSTRACT

An image display apparatus which removes a signal at an odd number frame (or an even number frame) from a sequential scanning video signal input thereto at a predetermined rate, transmits the residual signal to a memory unit at about a half of the predetermined rate through a transmission line, and reads the content of the memory unit every two times at a rate about equal to the predetermined rate, thereby displaying an image on the respective picture elements.

8 Claims, 9 Drawing Sheets

Fig. 7(A) INPUT DATA

Fig. 7(B) SELECTED DATA

Fig. 7(C) DISPLAY DATA

IMAGE DISPLAY APPARATUS

BACKGROUND OF THE INVENTION

1. Field of the Invention

The present invention relates to an image display apparatus for displaying images on various plane displays on which a large number of picture elements are disposed in a matrix manner.

2. Description of Related Art

Figure 1:
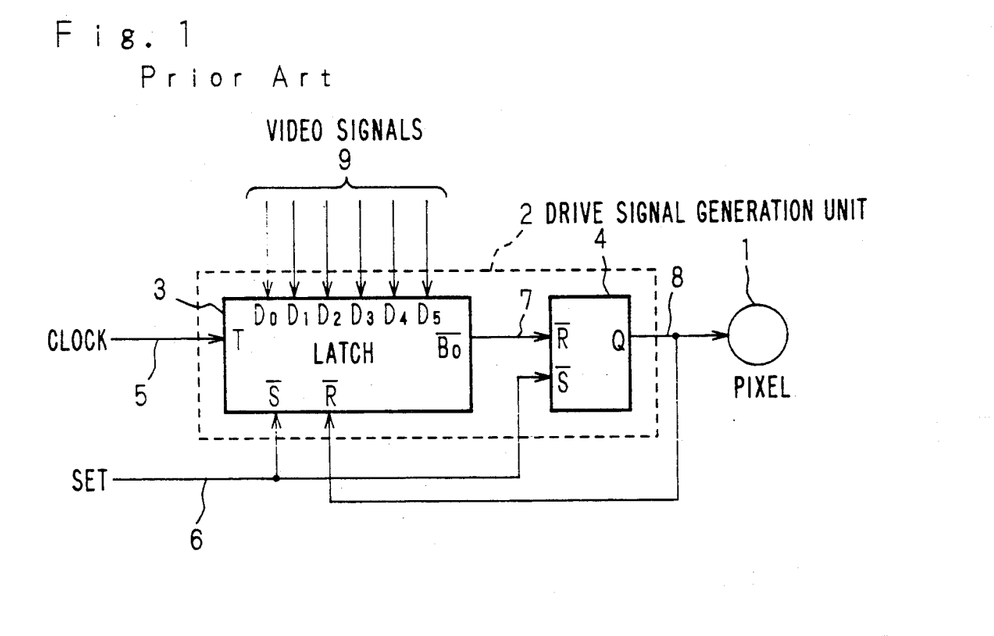
FIG. 1 is a block diagram of the principal portion of the conventional image display apparatus.

FIG. 1 is a block diagram of the principal portion of the conventional television image display apparatus disclosed in, for example, the Japanese Patent Application Laid-Open No. 56-4185, in which reference numeral 1 designates one of a larger number of picture elements disposed in a matrix on a screen (not shown), the picture element 1 being driven by a driving signal 8 from a driving signal generation unit 2. The driving signal generation unit 2 comprises a down counter 3 as a data memory and a flip-flop 4, the down counter 3 and flip-flop 4 being set by a set signal 6. The down counter 3 is loaded thereon with a television video signal 9 of data of, for example, six bits and counts clock 5. The flip-flop 4 is reset by a borrow signal 7 from the down counter 3 and gives to the picture element 1 the driving signal 8 as a signal of an output terminal Q: a Q-output.

Figure 2:
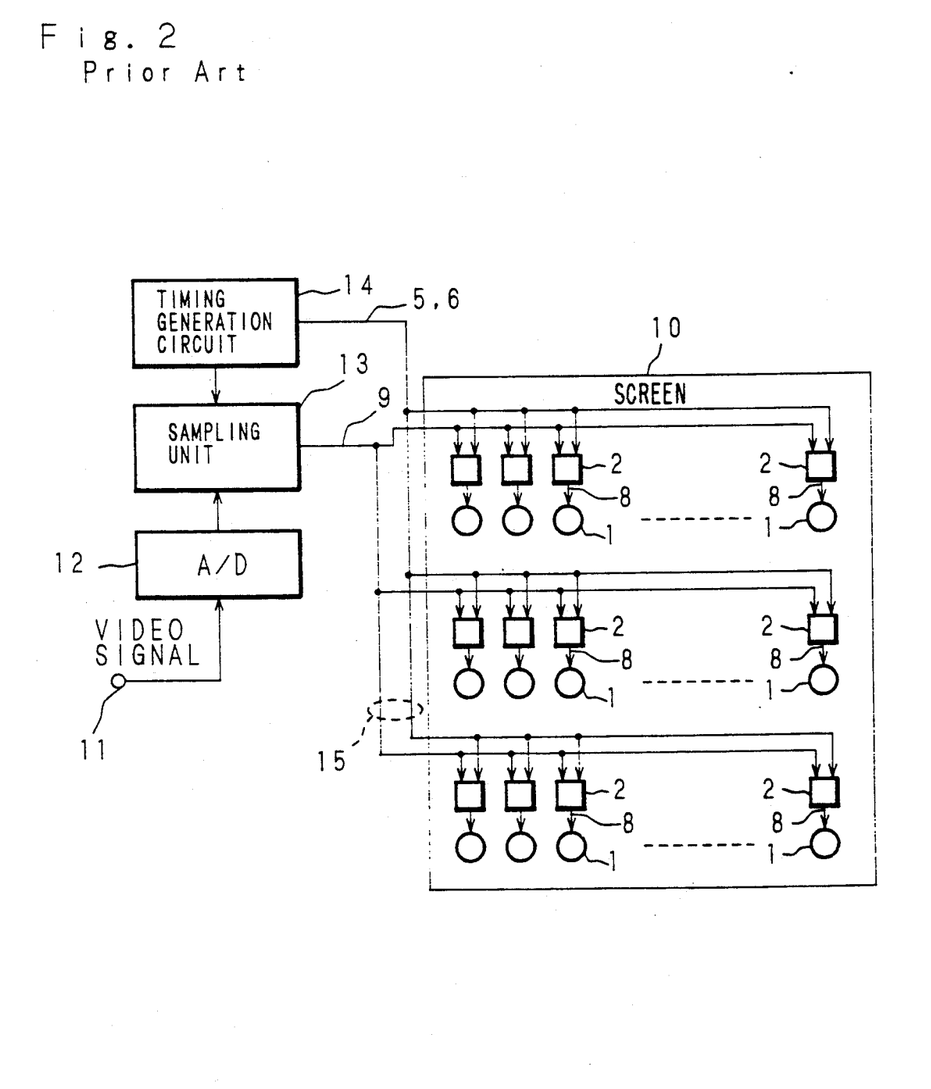
FIG. 2 is a block diagram of the conventional image display apparatus as a whole, FIG. 3 (A-D) shows the relation between the scanning lines and the picture elements of a television signal.
Figure 3A:
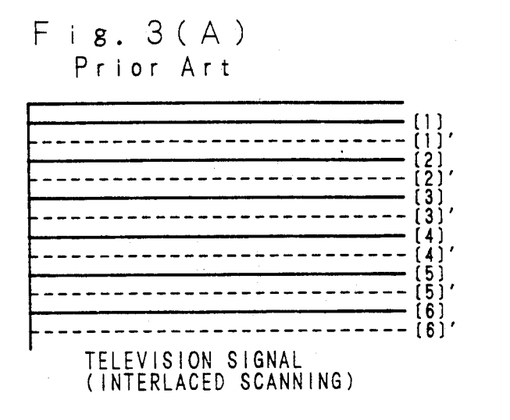
Figure 3B:
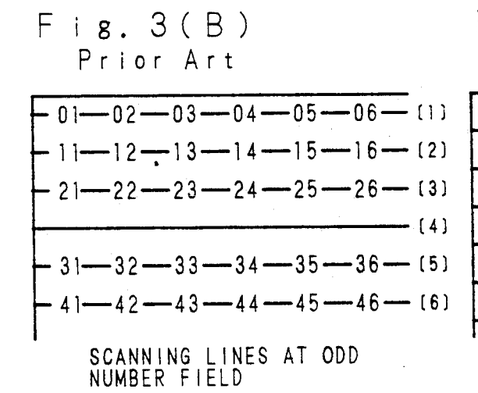
Figure 3C:
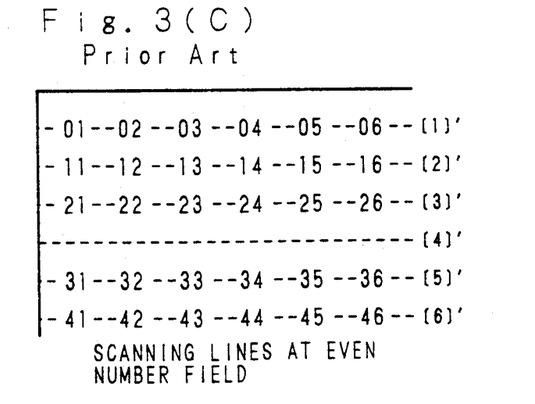
Figure 3D:
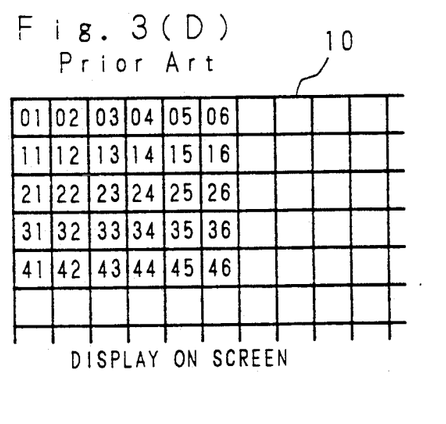

FIG. 2 is a general view of the conventional television image display apparatus, in which the components corresponding to those in FIG. 1 are designated by like numerals. In FIG. 2, reference numeral 10 designates a screen as a display unit, in which a large number of picture elements 1 are disposed in a matrix and the driving signal generation unit 2 constructed as the above-mentioned is provided for each picture element, and 12 designates an A/D converter for digitizing an analog video signal from an input terminal 11 so as to convert it into a 6-bit data, the converted 6-bit data being outputted to a sampling unit 13. The sampling unit 13 thins data from the converted video signal and samples data only corresponding to the number of picture elements 1 on the screen 10. Each driving signal generating unit 2 is connected to a timing generation circuit 14 for generating the clock 5, set signal 6 and other predetermined timing signals and to the sampling unit 13 through transmission lines 15 comprising flat cables, the clock 5 and set signal 6 being transmitted from the timing generation circuit 14 to each driving signal generation unit 2 and the video signals 9 sampled from the sampling unit 13 being transmitted from the sampling unit 13 to the same.

Next, explanation will be given on operation of the television image display apparatus of the invention. The video signal inputted from the input terminal 11 is converted into a digital signal of 6 bits by the A/D converter 12 and subjected to sampling processing of data corresponding to the number of picture elements of the screen 10 on the basis of the predetermined timing signal obtained from the timing generation circuit 14. The sampled data is transmitted through the transmission line 15 to the driving signal generation unit 2 at each picture element 1. Simultaneously with the set signal 6 setting the flip-flop 4, the 6-bit video signal 9 is loaded on the down counter 3. Immediately, the down counter 3 counts the clock 5 and the Q-output of flip-flop 4, in other words, the driving signal 8 goes to a logical "1", so as to light the picture element 1. The down counter 3, after counting for a time corresponding to the loaded data, counts a value of (000000) so as to output a borrow signal 7, thereby resetting the flip-flop 4 and down counter 3. Accordingly, the driving signal is a logical "0" and the picture element is put out to stop the counting operation. Hence, the flip-flop 4 generates the driving signal 8 having a time length of 64 stages corresponding to the data loaded on the down counter 3 to result in that the picture element 1 is driven.

FIG. 3 shows a correspondent relation between the scanning lines and the picture elements at the television signal. FIG. 3(A) shows a mode of interlaced scanning, in which the scanning lines (1) through (6) at the odd number field represented by solid lines and those (1)' through (6)' at the even number field represented by broken lines are alternately transmitted. FIGS. 3(B) and (C) show the state whose scanning lines at the odd number and even number fields are thinned out, in which Nos. 01 through 26 and 31 through 46 show sampling points respectively, FIG. 3(D) showing the display state on the screen 10 by the sampled data.

Generally, the television signal has a sufficient amount of information, so that at the screen 10 side the data corresponding to the number of picture elements included in the screen 10 are thinned from the television signal at the sampling unit 13 to thereby be utilized. FIG. 3 shows an example in which the scanning lines (4) and (4)' are thinned corresponding to the number of picture elements vertical of the screen 10. The horizontal scanning lines are similarly thinned or the sampling cycle period is changed, so as to perform the processing corresponding to the number of horizontal picture elements on the screen 10. Since the data of each picture element 1 is updated in synchronism with the television signal at every one field (1/60 sec for NTSC system), the aforesaid operation is repeated at every picture element so as to display television images of 64 stages.

Thus, this kind of conventional display apparatus utilizes part of the amount of information included in the input television signal. Hence, the number of picture elements included in the screen 10 is restricted by the amount of information included in the television signal. For example, the number of vertical picture elements on the screen 10, when the input is in the NTSC system, is at most 240 (the number of effective scanning lines per one field at the NTSC system) picture elements.

On the other hand, there is a recent tendency of requiring high densification of display for the screen. In other words, the number of picture elements constituting the screen tends to increase, whereby the number of vertical picture elements on the screen leads to exceeding the number of scanning lines (about 240 per field in the case of NTSC system) of the television signal, for which three countermeasures therefor are considered as follows:

(1) At the display unit side, the data is interpolated after A/D conversion to thereby produce data corresponding to 240 or more scanning lines.

(2) In accordance with the timing of interlaced scanning, the data of picture element column in the odd number (or even number) lines at the display unit is rewritten to one field and the data of the even number (odd number) lines is rewritten to the next field.

(3) Like the television signal obtained by IDTV (Improved Definition Television), EDTV (Extended Definition Television), or the like, at the signal source side, scanning line interpolation is performed with respect to the television signal on the basis of timing of the interlaced scanning, thereby substantially increasing the number of scanning lines per one field.

The above-mentioned three methods each have advantages and disadvantages as follows:

The above method (1), by which all the data of the screen can be rewritten by 1/60 sec per field, is realizable of smooth mobile picture display. However, since the data is interpolated at the field portion of transmission line, an amount of information to be transmitted increases corresponding to the number of picture elements on the screen (the amount of information on the screen). Since the amount of information passable through the transmission line is limited especially when a flat cable is used as the transmission line, the size of screen capable of corresponding to the amount of information is limited.

The above method (2) can correspond to 480 vertical picture elements, two times as large as the conventional method, without increasing the data transmission speed, that is, the amount of information to be transmitted. Since the data of the display unit is rewritten at every other line on each field, the data on the screen is substantially rewritten by one frame (1/30 sec), thereby generating flickering on display.

In addition, in the method (2), there is a possibility that a further large-scale display is realizable by interpolating the data in the method (1) together. Therefore, a concrete method for the above is realized by a display unit disclosed in the Japanese Patent Application Laid-Open No. 60-158779, which is characterized in that a latch circuit is provided at the upstream side of a down counter 3 in FIG. 1. When each picture element on the scanning line at one field of interlaced scanning is driven, a display cell on the scanning line at another field is adapted to be simultaneously driven by again loading to the down counter the data latched to the preceding field, whereby the display is repeated at one field cycle period (1/60 sec) and flickering on display can be eliminated. However, since there is a time difference by one field (1/60 sec) at every line, images of high resolution is obtained with respect to the still picture, but for quick motion images, a display difference between the scanning lines corresponding to motion for 1/60 sec simultaneously appears, thereby creating the problem in that the image becomes turbulent.

Next, the method (3) has twofold 480 scanning lines per one field for both IDTV and EDTV, thereby obtaining display of high resolution, but an amount of information to be transmitted at the signal source side becomes substantially twofold, thereby creating the problem in that transmission of the information is difficult.

SUMMARY OF THE INVENTION

An image display apparatus of the present invention removes a signal at the odd number frame or the even number frame of sequential scanning video signal input at a predetermined rate, transmits the residual signal to a memory at about a half of the predetermined rate through a transmission line, and repeatedly reads the content of the memory every twice at about the same rate as the predetermined rate, thereby displaying an image on each picture element.

An object of the invention is to provide an image display apparatus which can display images at high resolution with respect to a display unit in which the number of picture element lines exceeds the number of scanning lines per one field by the interlaced scanning.

Another object of the invention is to provide an image display apparatus which can perform image display of high resolution without increasing the amount of information to be transmitted and causing flickering.

Still another object of the invention is to provide an image display apparatus which does not disturb the images even for the video signal quick in motion, but can display smooth motion.

The above and further objects and features of the invention will more fully be apparent from the following detailed description with accompanying drawings.

DESCRIPTION OF THE PREFERRED EMBODIMENTS

Next, the embodiments of the invention will be described in accordance with the drawings.

Figure 4:
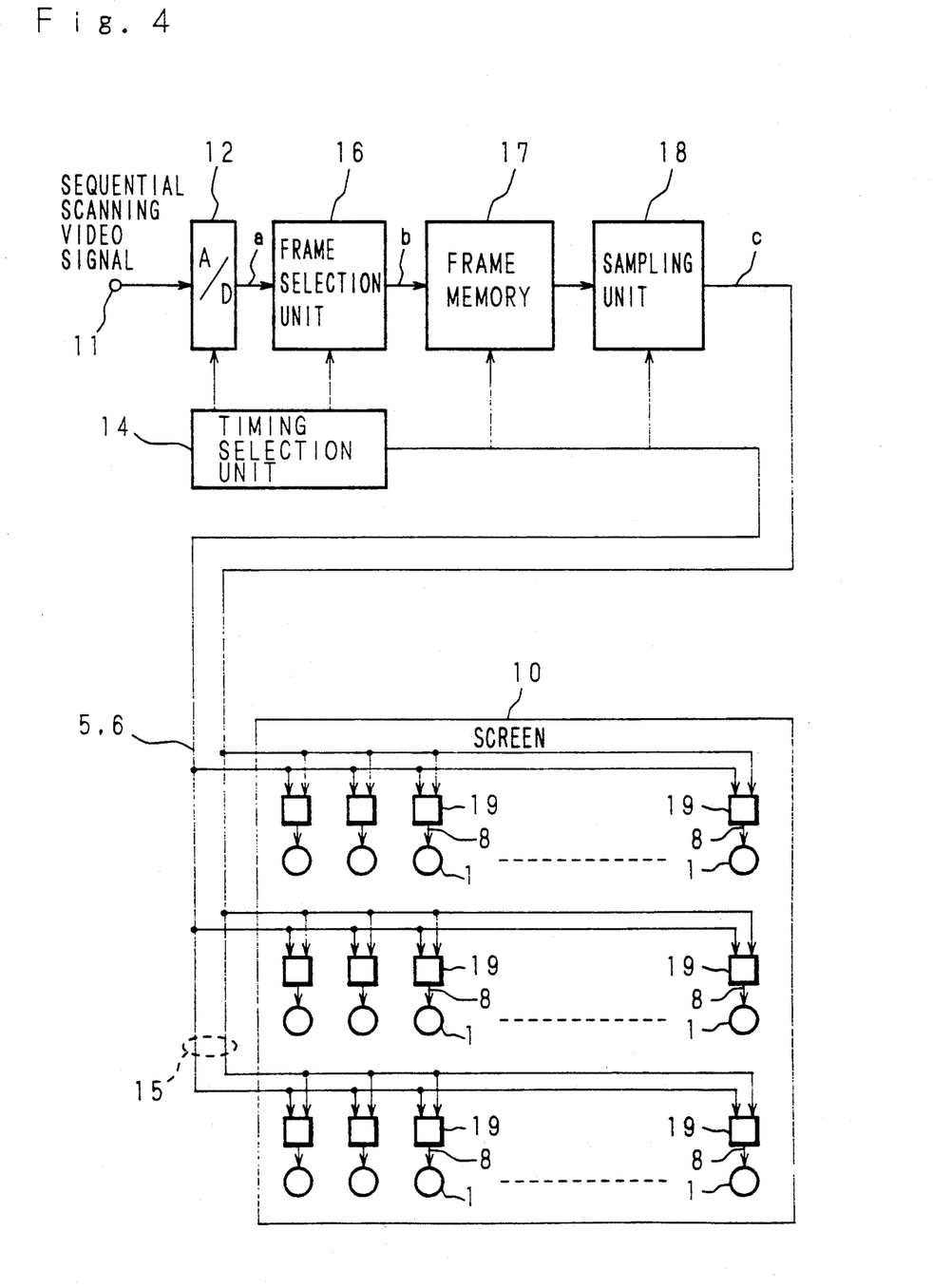
FIG. 4 is a block diagram of an embodiment of an image display apparatus of the invention.

In FIG. 4, the components corresponding to those in FIG. 2 are designated by like numeral references and omitted of description thereof.

In FIG. 4, reference numeral 16 designates a frame selection unit for selecting data only at odd number frame or even number frame from a digital video signal obtained from an A/D converter 12, the data selected by the frame selection unit 16 being once written in a frame memory 17. The data read out from the frame memory 17 is subjected to a thinning processing corresponding to the number of picture elements on a screen 10 by a sampling unit 18 substantially the same as a sampling unit 13 in FIG. 1. The data thinned by the sampling unit 18 is transmitted to a driving signal generation unit 19 of driving means for every one picture element through transmission lines 15.

Figure 5:
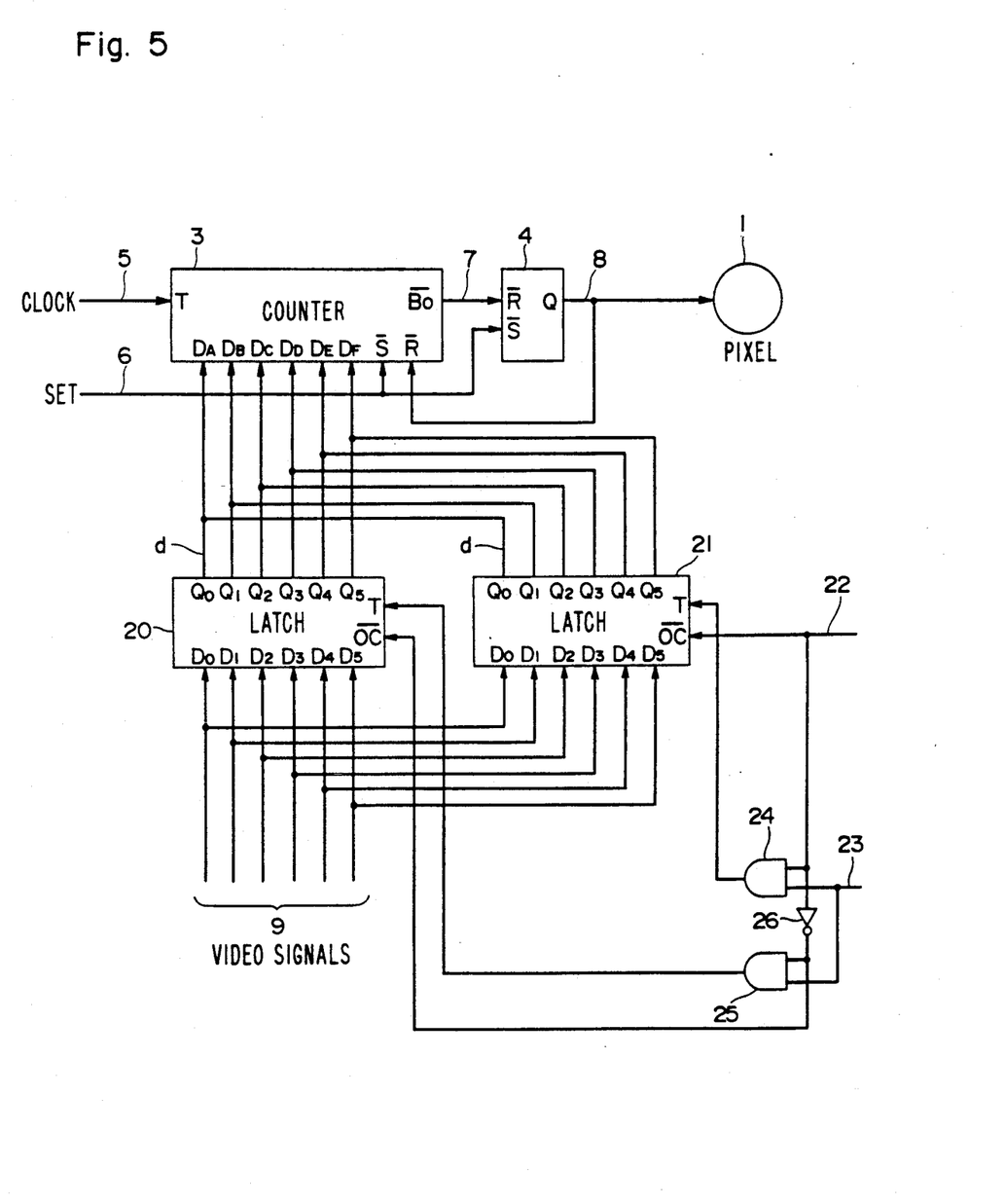
FIG. 5 is a block diagram of the principal portion of the embodiment of the image display apparatus of the invention.

FIG. 5 is a block diagram of the driving signal generation unit 19, in which the components corresponding to those in FIG. 1 are designated by like reference numerals and omitted of description thereof.

In FIG. 5, reference numerals 20 and 21 designate latch circuits for alternately holding a video signal 9 as 6-bit data obtained from the sampling unit 18, so that output data from the latch circuits 20 and 21 are loaded to a down counter 3, the latch circuits 20 and 21 being connected with the output sides of AND gates 25 and 24 given a transmission flag 22 and a latch signal 23 so that the outputs from the AND gates 25 and 24 allow the latch circuits 20 and 21 to operate. On the transmission line for the transmission flag 22 between the AND gates 25 and 24 is provided an inverter 26 for inverting the transmission flag 22 to apply it to the AND gate 25.

In addition, the frame selection unit 16 and frame memory 17 constitute first memory means and the latch circuits 20 and 21 second memory means.

Next, operation will be given on operation of the embodiment of the image display apparatus of the invention.

Figure 6:
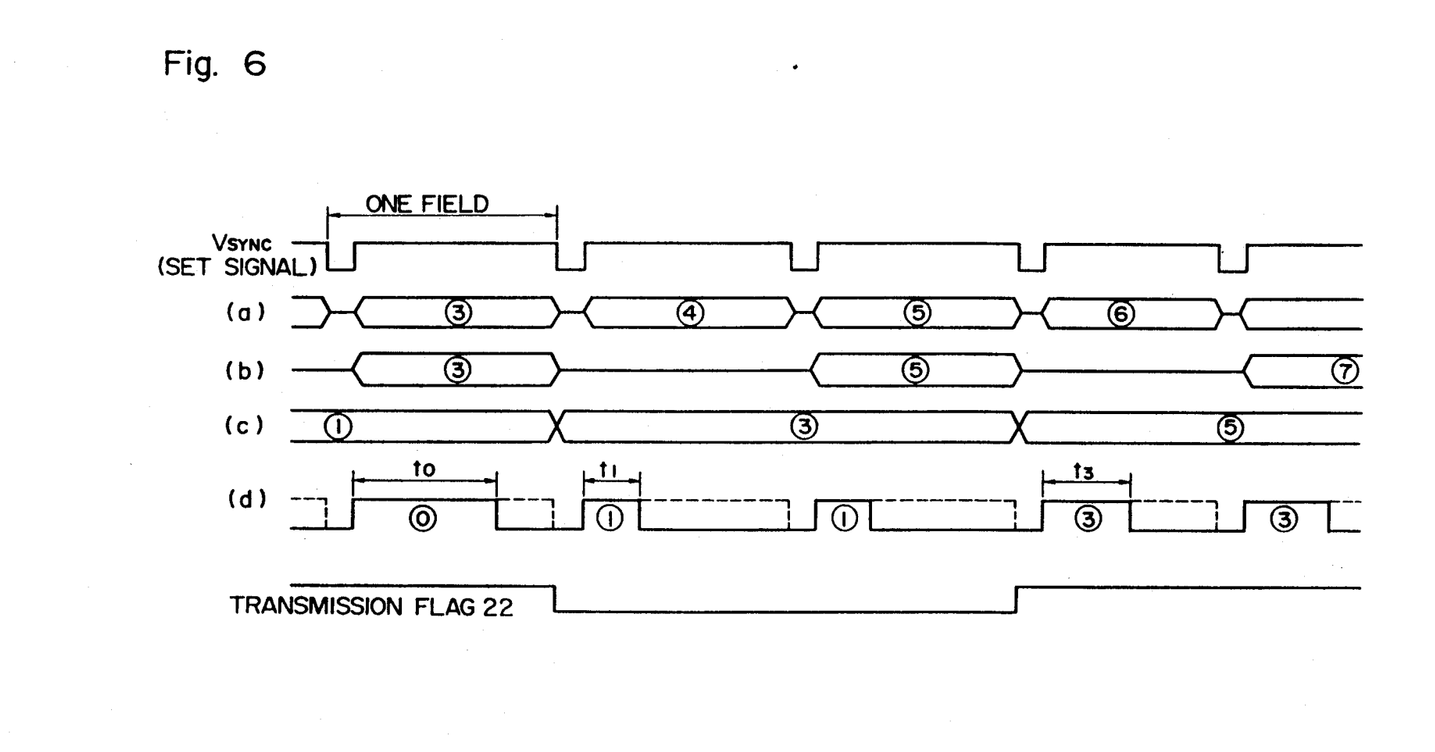
FIG. 6 is a timing chart explanatory of operation of the embodiment of the image display apparatus of the invention in FIG. 4, FIG. 7 (A-C) is a structural view of the data of the embodiment of the image display apparatus of the invention.

FIG. 6 is a timing chart explanatory of operation of the image display apparatus of the invention, in which Vsync designates a vertical synchronizing signal obtained from the input video signal, which signal is used as a set signal per one frame, FIGS. 6(a), 6(b) and 6(c) showing signals at the points, a, b and c in FIG. 4 respectively, FIG. 6(d) showing the signal at the output side of latch circuits 20 and 21 in FIG. 5. FIG. 7 conceptionally shows variation in data until actual display is performed by the present invention.

Figure 7A:
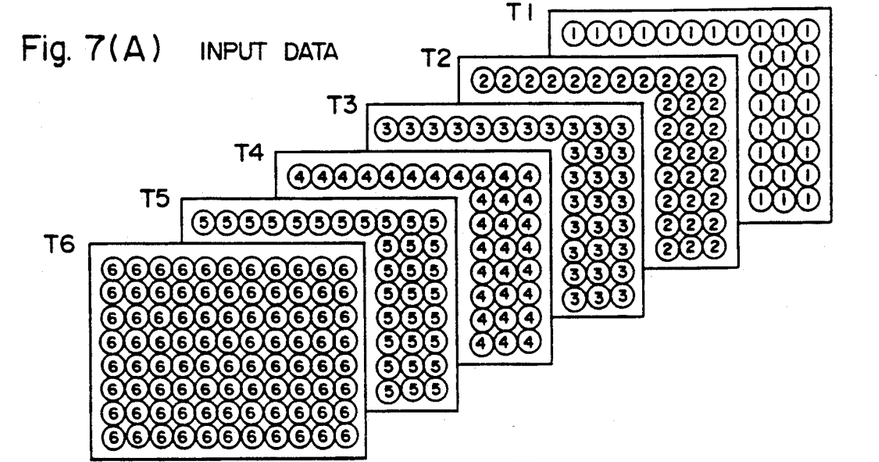
Figure 7B:
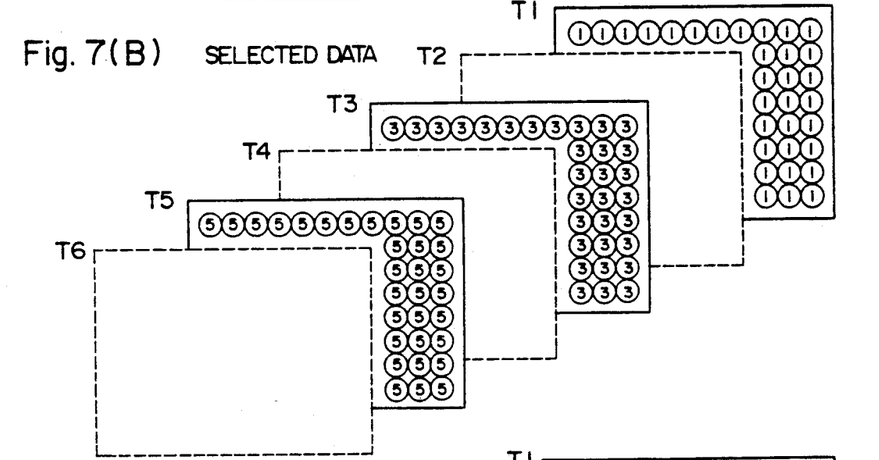

At the input terminal 11 in FIG. 4 is input a sequential scanning analog video signal. The video signal is digitized at a predetermined cycle period by the A/D converter 12, and thereafter only the image data corresponding to the images of the odd number or the even number frame are selected from the continued images at the frame selection unit 16 and stored in the frame memory 17. FIG. 6(a) and $T_1$ through $T_6$ in FIG. 7(A) show the timing of sequential scanning signal and the data of the first through sixth frames. The standard television signal of NTSC system or the like essentially comprises 240 effective scanning lines per one field (1/60 sec). On the other hand, the television signal, such as IDTV or EDTV, converted to sequential scanning is subjected to interpolation of scanning line in order to improve the vertical resolution, which comprises 480 effective scanning lines per one frame, i.e., one field (1/60 sec), thereby substantially doubling the amount of information. At the frame selection unit 16, as shown in FIG. 6(b) and FIG. 7(B), the second, fourth and sixth frames are removed, thereby removing ½ of the information included in the input signal, wherein the input signal is once stored in the frame memory 17 and then subjected to the thinning processing by the sampling unit 18 corresponding to the number of picture elements included in the screen 10, and as shown in FIG. 6(c), delivered to the transmission lines 15 at the rate of ½ of the input rate of sequential scanning signal. Accordingly, the amount of information at the transmission lines 15 is the same as that of the standard television signal.

The data of the first, third and fifth frames transmitted to the transmission lines 15 and shown by $T_1$, $T_3$ and $T_5$ in FIG. 7(B) are delivered to the latch circuits 20 and 21 and alternately held thereto corresponding to the timing of transmission flag 22 and latch signal 23. Next, the data held to the latch circuits 20 and 21, as shown in FIG. 6(d), are read alternately every twice at twofold rate to that when transmitted and then loaded to the down counter 3. Hence, a driving signal 8 is generated by the down counter 3 and flip-flop 4 to drive the picture elements 1. In addition, time periods $t_0$, $t_1$ and $t_3$ in FIG. 6(d) show that of the driving signal 8 corresponding to all the data at the frame.

Thus, 480 scanning lines are effectively utilizable without increasing the amount of information to be transmitted, so that no disturbance in images is caused by a time difference between the scanning lines, thereby obtaining the images of high resolution with respect to the still picture.

Figure 7C:
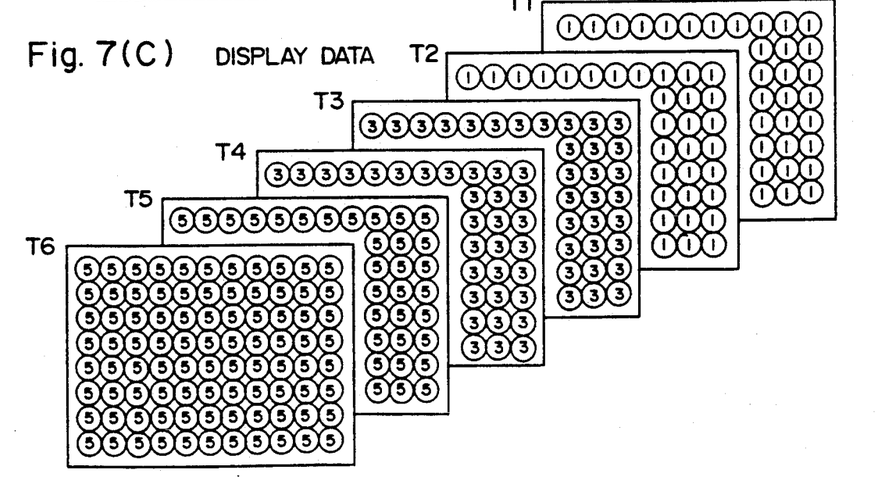

Also, for a moving picture, the data of latch circuits 20 and 21 are updated every 1/30 sec, wherein in order to avoid the flickering in display, the data is read out and displayed every two times until the held data is nextly updated. Accordingly, as shown in FIG. 7(C), 30 images are displayed every twice per one second, that is, the total 60 times, which applies the principle of the general motion picture. For reference, for the motion picture, 24 images are displayed every twice per one second, that is, 48 times. The reason for displaying the data every twice is that the number of repetitions of display increases to eliminate the flickering. Therefore, the present invention is resulted in that a smoother moving picture than at least the general motion picture is realizable with respect to the motion picture.

In addition, in the above-mentioned embodiments, the latch circuits 20 and 21 as the second memory means are provided at every picture element, which may alternatively be a frame memory or other similar memory means, having address corresponding to each picture element.

Figure 8:
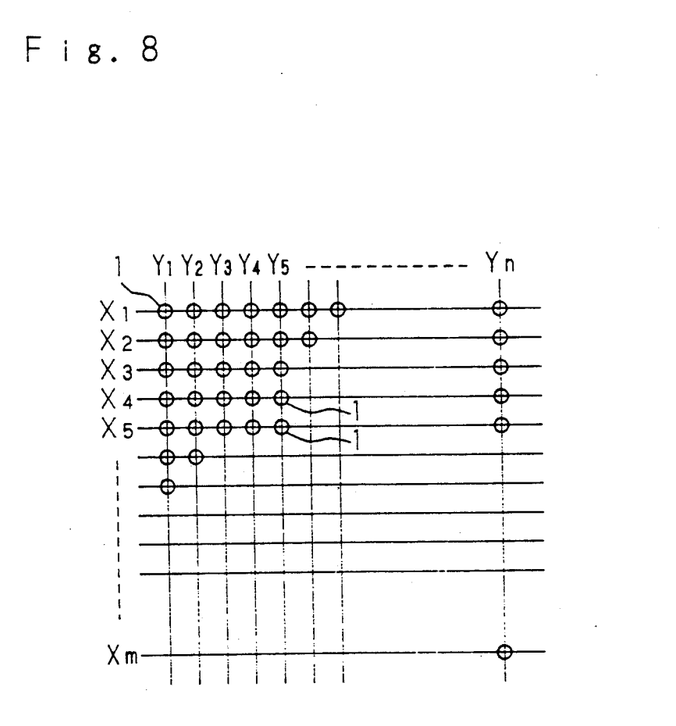
FIG. 8 is a structural view of the principal portion of a modified embodiment of the image display apparatus of the invention.
Figure 9:
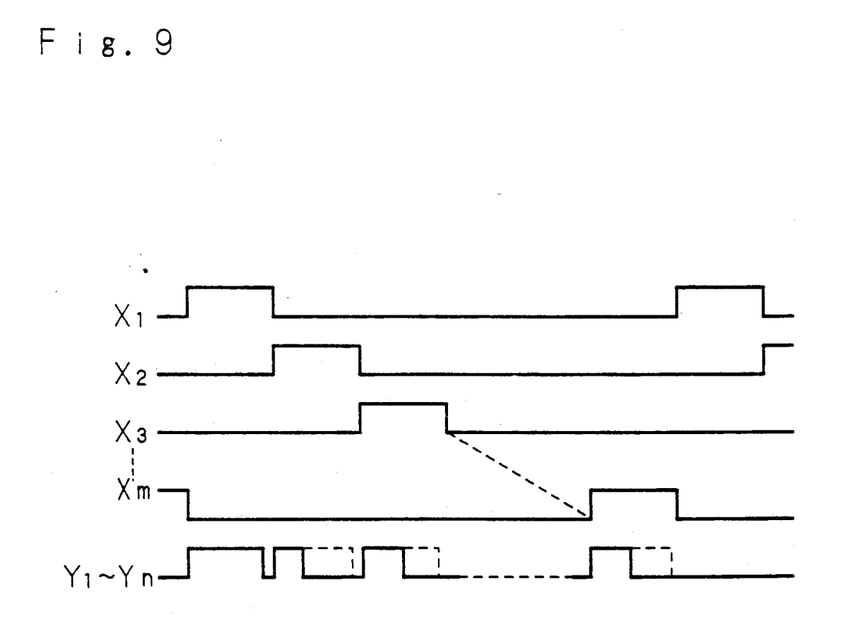
FIG. 9 is a timing chart explanatory of operation of the image display apparatus shown in FIG. 8.

Furthermore, in the above-mentioned embodiments, each picture element is independent and the embodiments are shown as the active matrix system of separately driving each picture element. Alternately, as shown in various panel displays, the display element of a method (the simple matrix system) having drive means at every line and column so as to control the picture elements positioned at the intersection of both the line and column may be used, thereby enabling the same control. FIG. 8 shows an embodiment in this case, in which the relation between the picture element and the electrode for driving it, and FIG. 9 shows the timing of driving each electrode.

In FIG. 8, reference letters $X_1$ through $X_m$ designate electrodes in the direction of the line and $Y_1$ and $Y_n$ those of the columns, the picture element 1 being provided at each intersection of the respective electrodes $X_1$ through $X_m$ and $Y_1$ through $Y_n$. As shown in FIG. 9, the electrodes $X_1$ through $X_m$ are sequentially driven for the predetermined time period and those $Y_1$ through $Y_n$ are sequentially driven at every time length corresponding to the data, so that each picture element 1 is driven to perform display. Herein, each picture element is driven by being sequentially controlled by time division at every line, to which the present invention applicable.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims:

What is claimed is:

1. An image display apparatus having a plurality of picture elements, comprising:
   first memory means for storing therein a signal at every other frame of a sequential scanning video signal input at a predetermined input rate and outputting the stored signal substantially continuously during a video frame at about a half of the input rate;

second memory means for storing therein the signal output from said first memory means and twice outputting the stored signal at a rate about equal to said input rate; and driving means for driving said picture elements on the basis of the signal output from said second memory means.

2. An image display apparatus according to claim 1, further comprising transmission means for transmitting to said second memory means said signal output from said first memory means.

3. An image display apparatus according to claim 2, wherein said transmission means transmits said signal output from said first memory means to said second memory means at about a half of said input rate.

4. An image display apparatus according to claim 1, wherein said first memory means has selection means for selecting a signal at an odd number frame or a signal at an even number frame of said sequential scanning video signal and a frame memory for storing therein the signal selected by said selection means.

5. An image display apparatus according to claim 1, wherein said second memory means has two latch circuits for storing therein said signal output from said first memory means.

6. An image display apparatus according to claim 5, wherein each of said latch circuits stores therein the same signal output from said first memory means and alternately outputs the stored signal to said driving means.

7. An image display apparatus according to claim 1, wherein said driving means has generating means for generating a driving signal for driving said picture elements, on the basis of said signal output from said second memory means.

8. An image display apparatus according to claim 1, wherein said driving means drives each of said picture elements respectively.

* * * * *